United States Patent [19]

Herbert et al.

[11] 4,076,284
[45] Feb. 28, 1978

[54] OCEAN FLOOR RISER CONNECTION

[75] Inventors: John T. Herbert; Frank J. Kovitch, both of Arlington; Paul E. Sullivan, Euless, all of Tex.

[73] Assignee: Murdock Machine & Engineering Co., Irving, Tex.

[21] Appl. No.: 683,635

[22] Filed: May 5, 1976

[51] Int. Cl.² .............................................. F16L 27/04
[52] U.S. Cl. ..................................... 285/263; 285/223
[58] Field of Search ................. 285/49, 223, 231, 234, 285/261, 263, 233, 54; 277/30; 64/11 R

[56] References Cited

U.S. PATENT DOCUMENTS

| 3,026,815 | 3/1962 | Jacobs | 285/49 |
| 3,734,546 | 5/1973 | Herbert et al. | 285/49 |
| 3,853,337 | 12/1974 | Herbert et al. | 285/49 |

FOREIGN PATENT DOCUMENTS

| 674,506 | 11/1964 | Italy | 285/263 |

*Primary Examiner*—Wayne L. Shedd
*Attorney, Agent, or Firm*—Richards, Harris & Medlock

[57] ABSTRACT

A flexible riser connector for connecting an offshore well pipe to a riser extending upward from the ocean floor is provided. An annular cup-shaped housing with an upfacing central cavity and a cylindrical bottom port is axially adjoined to the well pipe. A nipple having an inner bore and a downfacing and flared lower end is axially adjoined to the riser, and depends into the upfacing central cavity of the annular housing. The riser is supported by a guide ring slidably mating with the inner surface of the flared lower end of the nipple, and mounted to the bottom of the cup portion of the annular housing. An elastomeric body including an assembly of concentric spherical rings radially spaced apart by elastomeric pads is adhered to the outer surface of the flared end of the nipple, and to the lower surface of a collar in sealed relation with the inner surface of the annular housing. The collar is captured within the annular housing by a retainer. Angular deviation between the axis of the nipple and that of the annular housing is accommodated by making the inner and outer surfaces of the flared lower end of the nipple, the surface of the guide ring contiguous to the inner surface of the flared lower end, the rings of the elastomeric seal, and the lower surface of the collar spherical with respect to a point located on the longitudinal axis of the annular housing and slightly below the flared end of the nipple.

11 Claims, 5 Drawing Figures

OCEAN FLOOR RISER CONNECTION

FIELD OF THE INVENTION

This invention relates to a riser connection to be used to provide flexibility in a connection between a fixed well head at the floor of a body of water and a riser extending upward to a surface station.

PRIOR ART

In drilling and producing oil wells in marine areas too deep for the erection of a platform and requiring the use of floating surface structures, a "surface" casing generally is set in a relatively shallow borehole with the mouth of the casing therein at the ocean floor. Drilling operations are then conducted from a floating surface vessel through the casing. The present invention is particularly directed to a connector to couple the casing and the operating instrumentalities at the surface. In this environment a connection is necessary between the casing and the riser which will permit lateral deflection in response to ocean currents and surface forces without undue stress, and which will provide for passage of drills, casing, tubes, tools, etc., from the surface into the borehole. In such environment, a connector is subject to widely varying forces. A drill pipe initially would extend downward through the riser and riser connector, and thence into and through the surface casing during drilling operations. Drilling fluid pumped down through the drill pipe would circulate back to the surface through the annulus. As the well is drilled, casing would be lowered through and set in the well entering by way of the riser and the riser connector. Producing operations may involve subjecting the riser connector to production pressures which could be substantially higher than the hydrostatic head on the outer periphery of the riser connector. Thus, during the lifetime of a well, the riser connector serves as an essential and vital element.

Heretofore flexible pipe connections have been provided using elastomeric elements to accommodate deflection of rigid pipes at a joint. Representative of such structures are the joints illustrated and described in U.S. Pat. Nos. 3,390,899; 3,680,895; 3,734,546 and 3,853,722.

The present invention is directed to structure uniquely capable of providing flexibility at the ocean floor in the joint between a well pipe and a riser extending to the water surface. In such devices, the piping to be accommodated through the passage in the flexible connector may be of different sizes but generally range up to maximums of 13 to 24 inches in diameter. Accommodation of such units in the environment involved thus requires a massive structure, the housing being of the order of 4 to 5 feet in diameter with the height of the overall unit of the order of 6 feet.

Such units further are subject to hydrostatic pressures and forces of great magnitude. In addition, it must be understood that the step of drilling a well involves a flow of cuttings out of the well. Particulate matter will thus flow in and around the various parts of the connector. The present invention provides a flexible connector for accommodating the riser connector environment.

SUMMARY OF THE INVENTION

A flexible riser connector is provided for connecting an offshore well pipe to a riser extending upward from the ocean floor. An annular housing has an upfacing central cavity with a cylindrical bottom port. A nipple having an inner bore extends into the housing with a downfacing flared lower end, and is supported on a guide ring mounted at a plurality of spaced points about the inner surface of the housing. The guide ring is externally contoured to mate with the inside of the flared end of the nipple at surfaces spherical with reference to a common center point, such point being located on the longitudinal axis of the housing in the region of the plane of the flared end. An elastomeric body including an assembly of concentric spherical rings embedded therein is adhered to the outer surface of the flared end. The spherical rings are contoured and positioned in symmetry to the axis of the housing and to the center point. A collar encircles the nipple and is adhered to the outer surface of the elastomeric body. The collar further is mounted in movably sealed relation to the inner walls of the housing. A retainer secured at the mouth of the central cavity captures the collar within the cavity. Preferably, the guide ring structure is highly perforate in order to accommodate scouring of particulate matter that might otherwise lodge between the outer surface of the elastomeric body and the inner wall of the housing.

In one aspect of the invention, wear ring inserts are provided around the wall of the cylindrical bottom port of the annular housing, and around the inner wall of the nipple in the lower region of the inner bore.

In another aspect, the inner diameter of the guide ring is of the order of the inner diameters of the riser and surface casing to eliminate the need for wear ring inserts.

In still another aspect, the guide ring and annular housing are integral parts of a single casting.

DESCRIPTION OF THE DRAWINGS

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

DESCRIPTION OF PREFERRED EMBODIMENTS

Figure 1:
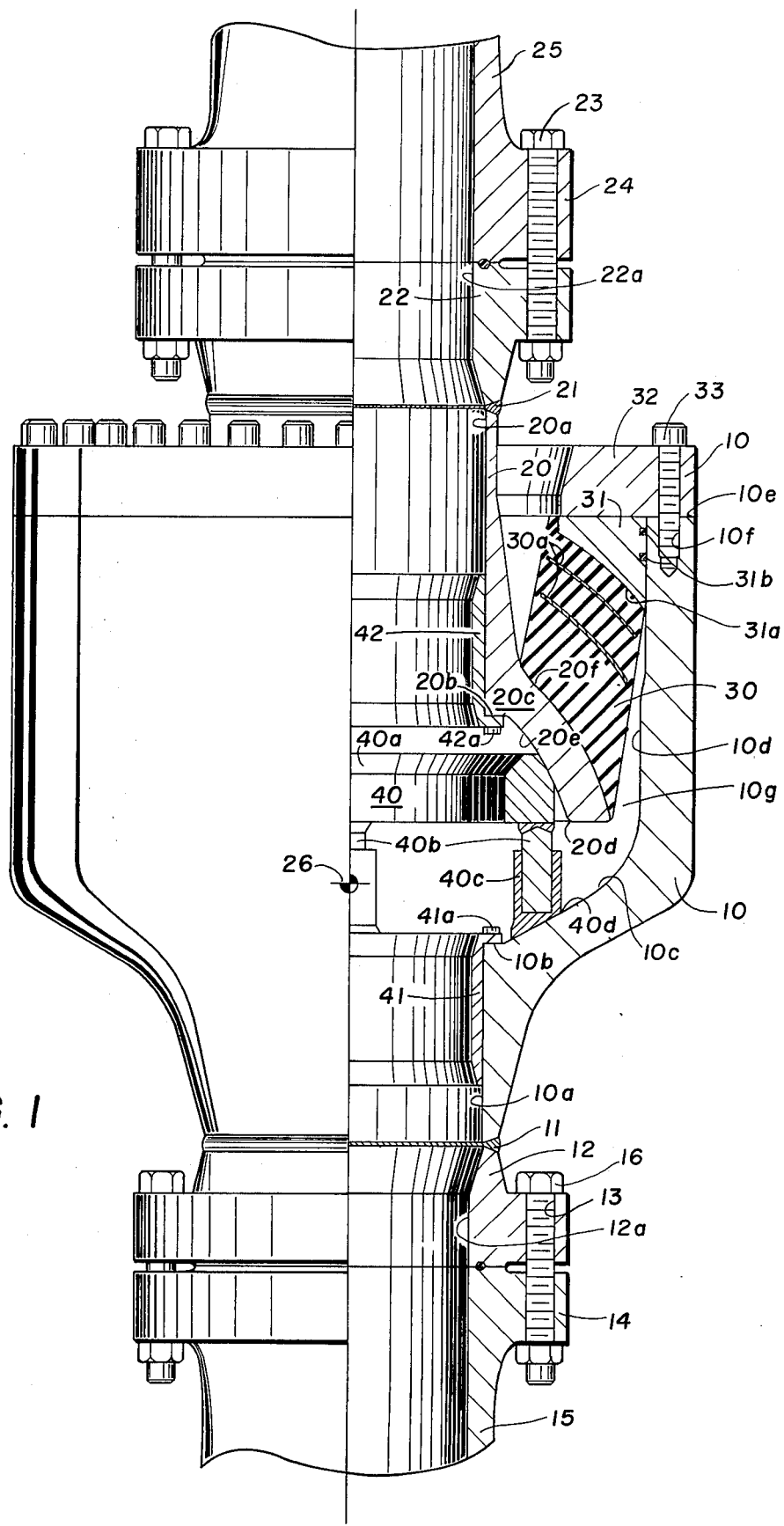
FIG. 1 is an elevation view partially in section of a preferred embodiment of the present invention.

Referring now to FIG. 1, a large cup-shaped housing 10 is supported at its lower end by a weld 11 to a flange 12. Flange 12 is provided with a ring of holes 13 to facilitate attachment to a mating flange 14 at the mouth of a well pipe, such as a surface casing 15. Bolts 16 thus serve to secure housing 10 at the ocean floor upright and upfacing.

Housing 10 has a cylindrical bottom port 10a which is slightly larger in diameter than the passage 12a through the flange 12. Bottom port 10a extends upwardly to a shoulder 10b at which point the wall extends outwardly in section 10c and terminates in a vertical wall portion 10d. The upper end 10e of housing 10 is provided with a ring of threaded holes 10f.

A nipple 20 extends downwardly into the cup portion of housing 10. Nipple 20 is connected by a weld 21 to a flange 22 which is secured by bolts 23 to a flange 24 connected to a riser 25 extending from the ocean floor to the surface.

The nipple 20 has a top cylindrical port or inner bore 20a that is of the same diameter as the bottom port 10a of housing 10. The cylindrical wall of bore 20a extends downwardly to a shoulder 20b at which point the nipple flares out to form a downfacing and flared portion 20c. Flared portion 20c terminates at a plane 20d. The inner surface 20e and the outer surface 20f of the flared portion are spherical, having as their center a point 26 that is located on the axis of the housing 10 and at a point slightly below the plane 20d.

As elastomeric seal 30 is bonded to the outer surface 20f of the flared portion 20c, and to the lower surface 31a of a collar 31 which also is spherical with reference to point 26. Collar 31 has an outer diameter sized to be received in the upper end 10e of the housing 10, with O-rings 31b in the outer periphery thereof providing a seal with respect to the inner wall of housing 10.

In addition to forming a seal, elastomeric seal 30 also acts as a flexible bearing to withstand axial loads created by pressure plus any externally applied tension loads. The elastomeric seal includes an assembly of spaced apart and structurally stiff rings 30a, which preferably are of metal. The rings are spaced apart one from another by rubber pads, and are completely encased in the same rubber body. The rings 30a are spherical with reference to point 26. By way of example, the seal 30 may comprise twenty pads with nineteen spherically shaped rings or washers arrayed therein, with the rings having successively increasing diameters from innermost to outermost.

A retainer ring 32 is secured by bolts 33 to the upper end 10e of the housing 10, serving to capture the collar 31 inside housing 10.

A guide assembly 40 is mounted in the bottom of the cupshaped portion of the housing 10. The guide assembly 40 comprises a guide ring 40a having an outer surface which is spherical with reference to point 26, and which mates with the inner surface 20e of the flared portion 20c of nipple 20. The ring 40a is supported by a plurality of legs 40b which are welded to the lower face. The lower ends of legs 40b are nested in cups 40c which are attached as by weldments 40d to the lower inside surface of housing 10. With this arrangement, the guide assembly serves as a support for the weight of the nipple 20, and for any elements secured thereabove and permitted to rest upon the structure leading to nipple 20.

Fluids flowing upward out of surface casing 15 may freely pass outward in the space between legs 40b to scour and keep free from particulate matter a zone 10g, which is between the inner wall of the cup housing 10 and the outer surface of seal 30.

The location of the point 26 becomes of significance where particulate matter may be involved in the operation. In this embodiment, the point 26 is spaced only slightly below the plane 20d of the flared end of the nipple 20. That results in the surface of the seal 30 being connected to the lower end of the nipple 20 at a point where the nipple surface is almost tangent to vertical. When the nipple 20 is tilted relative to housing 10, there is very little change in the dimension of the zone 10g, and thus little opposition to flexing of the coupling even though particulate matter may fill the void of zone 10g.

The system is provided with a pair of wear rings 41 and 42. Wear ring 41 is flanged and has an outer body diameter corresponding to the diameter of port 10a. It is secured in place by a ring of bolts 41a passing through the flange. Wear ring 42 is flanged to rest on shoulder 20b and is secured thereon by a ring of bolts 42a. The inner diameters of the wear rings 41 and 42 approximate but are slightly less than the diameters of the passage 12a at the bottom of housing 10, and a corresponding port 22a in flange 22.

Normally the flanged nipple 20 and elements imposed thereon from above will rest on and be supported by the guide assembly 40. In such condition, the nipple 20 may be tilted angularly relative to the axis of the housing 10, with relative movement being along the contact surface between the surface 20e and the outer surface of the ring 40a. If the hydrostatic pressure outside the unit exceeds the pressure and weight combination inside the unit, then the hydrostatic pressure will be imposed on the upper surface of the collar 31 to maintain the sealing member 30 under compression. Similarly, high pressures inside the unit and tension forces on the nipple 20 will raise the flange of nipple 20 off from the ring 40a, again placing the sealing unit 30 under compression. Angular deviation of the axis of the nipple 20 relative to the housing 10 causes movement along the spherical surface as defined in part by the rings 30a, and thus assures long life and freedom from destruction of any portion of the elastomeric seal 30. At the same time, the guide assembly 40 serves to guide and position the nipple 20 within housing 10 as nipple 20 undergoes movement.

Figure 2:
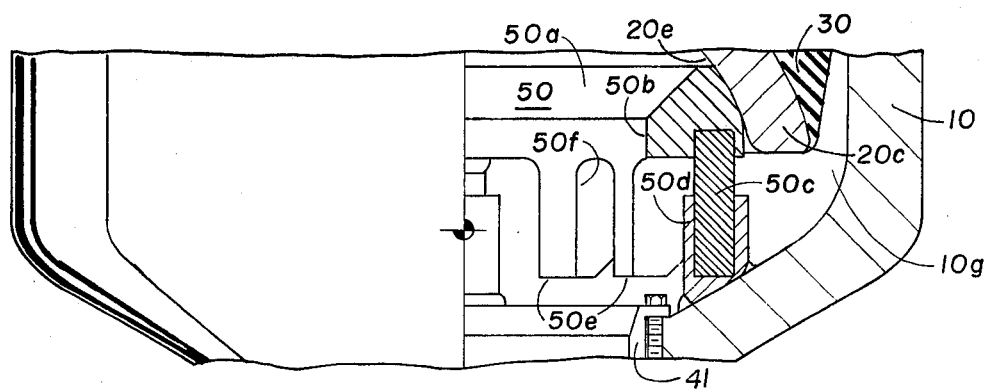
FIG. 2 illustrates a modified form of the guide assembly of FIG. 1.

FIG. 2 illustrates a portion of the lower end of the housing 10 of FIG. 1, wherein a modified guide assembly is employed. In this embodiment a guide assembly 50 is provided with the outer surface of a ring 50a being spherical for mating with the inner surface 20e of the flared portion 20c. A inner wall 50b of ring 50a is of the same diameter as port 10a and inner bore 20a. The ring 50a is supported by a plurality of legs 50c nested in cups 50d. The cups are welded to the inner surface of the housing 10. The ring 50a also is provided with a plurality of downwardly extending fingers 50e between which there are passages 50f. The fingers 50e serve as guides to direct a drill bit or other appendage on a pipe lowered into the upper end of the wear rings 41. At the same time, the passages 50f permit flow of scouring fluids outward into the zone 10g.

Figure 3:
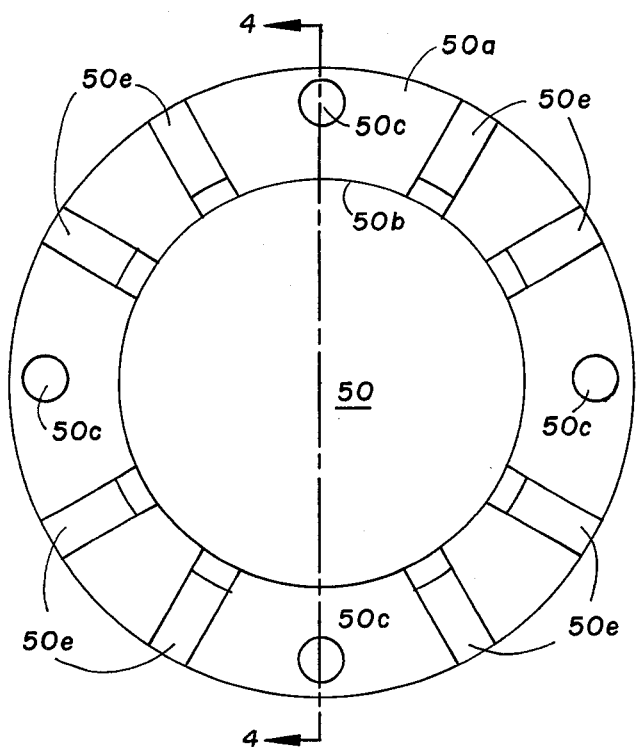
FIG. 3 is a bottom view of the guide ring of FIG. 2.
Figure 4:
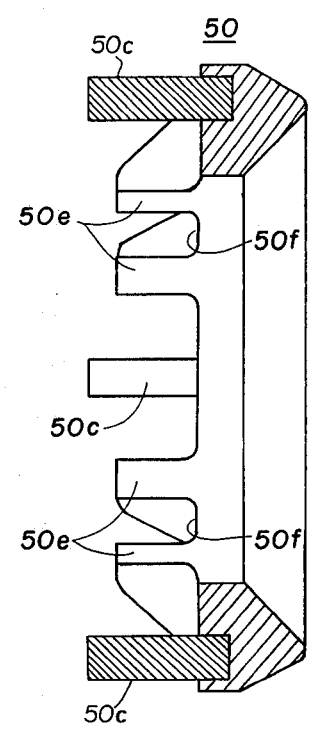
FIG. 4 is a sectional view of the guide ring of FIG. 3 taken along the line 4—4 of FIG. 3.

FIG. 3 is a bottom view of the guide assembly 50 of FIG. 2, and FIG. 4 is a side view of the assembly taken along the line 4—4 of FIG. 3. The ring 50a is provided in this embodiment with four legs 50c and with eight fingers 50e. In a typical embodiment where the diameter of ports 10a and 22a is about $16\frac{3}{4}$ inches, the diameter of the legs 50c and the thickness of the fingers 50e is of the order of 2 inches. The diametrical thickness of the ring 50a is of the order of 6 inches. Further, the fingers 50e are angled upwardly and outwardly in order to maintain adequate clearance relative to the inner wall of the housing 10.

Figure 5:
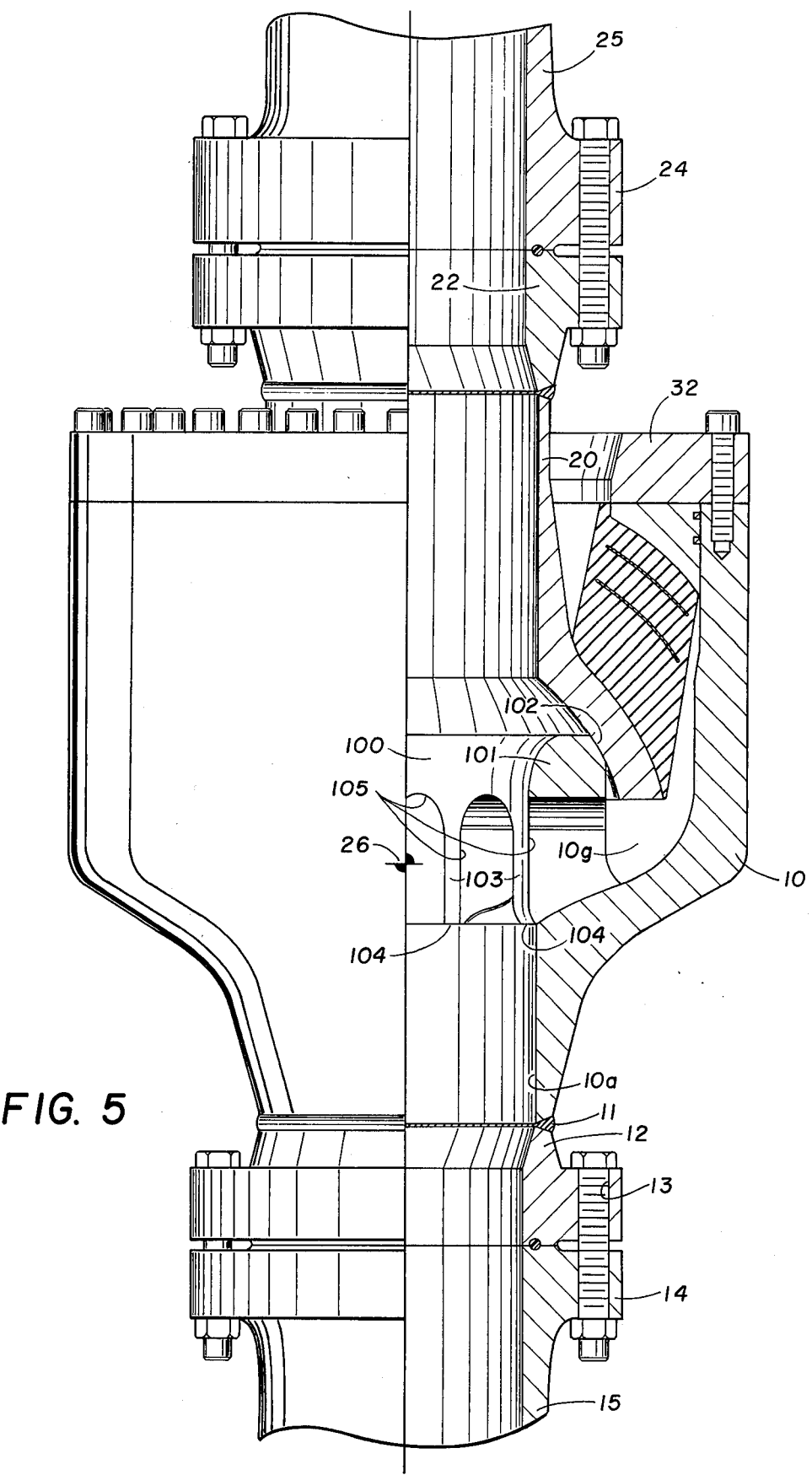
FIG. 5 illustrates a second guide assembly in accordance with the invention.

FIG. 5 illustrates a second guide assembly 100 including a guide ring 101 having an inner diameter of the order of the inner diameters of the riser 25 and the surface casing 15. An outer surface 102 of the guide ring is spherical with reference to point 26 to mate with the inner surface of nipple 20. The ring 101 is supported by a plurality of legs 103 which are formed from the casting of housing 10, or rooted into the lower face of the cup-shaped portion of housing 10 so that the inner walls of port 10a and ring 101 are aligned at surfaces 104. The legs 103 are separated by passages 105 to accommodate the scouring of particulate matter from zone 10g.

In accordance with the invention, there is provided a flexible riser connector for connecting an underwater well pipe to a riser extending upward to the surface. More particularly, an annular housing with an upfacing central cavity and a cylindrical bottom port is axially adjoined to the well pipe. A nipple having a cylindrical top port depends into the housing with a downfacing and flared lower end. A guide ring is mounted at a plurality of spaced points about the inner surface of the housing, and has an outer surface contoured for slidably mating with the inner surface of the nipple's lower end. An elastomeric seal comprising an assembly of spaced apart rings is bonded to the outer surface of the nipple's lower end, and to the lower surface of a collar in movably sealed relation with the inner surface of the housing. In order to accommodate the scouring of particulate matter from the riser connector, the inner and outer surfaces of the flared lower end of the nipple, the rings of the elastomeric seal, and the lower surface of the collar are spherical with respect to a central point located on the longitudinal axis of the housing and slightly below the nipple's lower end.

Having described the invention in connection with certain specific embodiments thereof, it is to be understood that further modifications may now suggest themselves to those skilled in the art, and it is intended to cover such modifications as fall within the scope of the appended claims.

What is claimed is:

1. In a flexible riser connector for joining a surface casing to a riser wherein a housing means is connected to said surface casing and into which an annular means connected to said riser depend, the combination therewith which comprises:
    (a) guide ring means mounted on at least three legs at a plurality of spaced points about an inner surface of said housing means and externally contoured to mate with an inner surface of said annular means for supporting said riser while accommodating scouring said housing means outside said ring means by flow of fluid between said legs;
    (b) elastomeric means adhered to an outer surface of said annular means for providing a resilient seal;
    (c) a collar adhered to the top surface of said elastomeric means and in sealed relation with the inner walls of said housing means; and
    (d) retainer means secured to the upper end of said housing means for capturing said collar in said housing means.

2. In a flexible riser connector for joining a surface casing to a riser wherein a housing is connected to said surface casing, said housing means having a flared upper end defining a central cavity and a cylindrical bottom port for receiving well casing from said riser and into which an annular means connected to said riser depends, said annular means having a cylindrical top port and a lower end spherically flared with respect to a central point for accommodating angular movement between said riser and said surface casing, the improvement comprising:
    (a) guide ring means mounted above and on at least three spaced legs to the inner surface of said flared upper end and externally contoured to mate with the inner surface of said lower end for supporting said annular means for free flow of fluids entraining particulate matter between said legs;
    (b) elastomeric means adhered to the outer surface of said lower end for providing a resilient seal;
    (c) a collar encircling said annular means and adhered to the top surface of said elastomeric means, said collar having a lower surface spherical with respect to said central point for providing a seal in movable relation with the inner walls of said housing means; and
    (d) retainer means secured to said flared upper end for capturing said collar in said housing means.

3. The combination set forth in claim 2 wherein the inner and outer surfaces of said lower end, and the lower surface of said collar are symmetrical to said central point.

4. The combination set forth in claim 3 wherein said central point is located on the longitudinal axis of said housing means and below the plane of said lower end.

5. The combination set forth in claim 2 wherein said guide ring means includes:
    (a) an annular member having an outer spherical surface symmetrical to said central point; and
    (b) a plurality of downwardly extending guide members connected to said annular member and spaced apart circumferentially at locations between said legs.

6. The combination set forth in claim 2 including a first wear ring seated in said cylindrical top port and a second wear ring seated in said cylindrical bottom port.

7. The combination set forth in claim 2 wherein the inner diameter of said guide ring means is of the order of the inner diameters of said riser and said surface casing, thereby eliminating the necessity for wear ring inserts around the inner walls of said cylindrical bottom port and said cylindrical top port.

8. The combination set forth in claim 2, wherein said elastomeric means includes:
    (a) a plurality of structurally stiff and spaced apart spherical rings symmetrical to said central point and having successively increasing diameters from the innermost to the outermost of said plurality of rings;
    (b) a plurality of rubber pads interspersed among said plurality of rings; and
    (c) a rubber body completely encasing said plurality of rings and said plurality of rubber pads.

9. The combination set forth in claim 2 wherein said guide ring means includes:
    (a) a guide ring having a second inner diameter at least as large as said bottom port; and
    (b) a plurality of downward extending fingers connected to the lower surface of said guide ring and circumferentially spaced apart between said legs.

10. The combination set forth in claim 9, wherein said guide ring, said plurality of fingers and said housing are integral parts of a single casting.

11. In a flexible riser connector for connecting an offshore well pipe to a riser extending upward from the ocean floor wherein an annular housing has an upfacing central cavity and a cylindrical bottom port with a nipple extending into said housing having a downfacing flared lower end, the combination therewith which comprises: (a) a guide ring mounted on a plurality of spaced legs to the inner surface of said annular housing and externally contoured to mate directly with the inside of said flared end at surfaces spherical with reference to a common center point located on the longitudinal axis of said annular housing in the region of the plan of said flared end while accommodating scouring said cavity outside said support by fluid flow between said legs;

(b) an elastomeric body having an assembly of concentric spherical rings embedded therein, with said body adhered to the outer surface of said flared end and with said rings contoured and positioned in symmetry to said axis and to said common center point;

(c) a collar encircling said nipple and adhered to the outer surface of said elastomeric body symmetrical to said axis and to said common center point, said collar being movably sealed to the inner walls of said annular housing; and (d) retaining means secured at the mouth of said cavity to capture said collar in said cavity.

* * * * *